(12) United States Patent
Ko et al.

(10) Patent No.: US 8,925,019 B2
(45) Date of Patent: Dec. 30, 2014

(54) SYNCHRONOUS DISPLAY STREAMING SYSTEM AND SYNCHRONOUS DISPLAYING METHOD

(71) Applicant: Institute for Information Industry, Taipei (TW)

(72) Inventors: Chin-Yu Ko, New Taipei (TW); Bo-Fu Liu, Tainan (TW); Shih-Chun Chou, Taipei (TW); Ren-Dar Yang, Hsinchu (TW); Hung-Sheng Chiu, New Taipei (TW)

(73) Assignee: Institute for Information Industry, Taipei (TW)

( * ) Notice: Subject to any disclaimer, the term of this patent is extended or adjusted under 35 U.S.C. 154(b) by 0 days.

(21) Appl. No.: 14/011,740

(22) Filed: Aug. 27, 2013

(65) Prior Publication Data

US 2014/0165111 A1 Jun. 12, 2014

(30) Foreign Application Priority Data

Dec. 6, 2012 (TW) .............................. 101145886 A (51) Int. Cl.
| | |
|---|---|
| H04N 7/16 | (2011.01) |
| H04N 21/242 | (2011.01) |
| H04N 21/41 | (2011.01) |
| H04N 21/81 | (2011.01) |
| H04N 21/8547 | (2011.01) |

(52) U.S. Cl.
CPC ......... *H04N 21/242* (2013.01); *H04N 21/4122* (2013.01); *H04N 21/816* (2013.01); *H04N 21/8547* (2013.01)
USPC ........................................................ 725/74

(58) Field of Classification Search
CPC .................................................... H04N 21/242
See application file for complete search history.

(56) References Cited

U.S. PATENT DOCUMENTS

| | | | |
|---|---|---|---|
| 7,196,722 B2* | 3/2007 | White et al. | 348/211.99 |
| 7,782,363 B2* | 8/2010 | Ortiz | 348/211.8 |
| 8,054,382 B2* | 11/2011 | Burckart et al. | 348/553 |
| 8,589,986 B2* | 11/2013 | McCoy et al. | 725/62 |
| 2002/0089587 A1* | 7/2002 | White et al. | 348/105 |
| 2003/0197785 A1* | 10/2003 | White et al. | 348/207.99 |
| 2004/0032495 A1* | 2/2004 | Ortiz | 348/157 |
| 2005/0262542 A1* | 11/2005 | DeWeese et al. | 725/106 |
| 2007/0240190 A1* | 10/2007 | Arseneau et al. | 725/81 |
| 2008/0019667 A1* | 1/2008 | Uehara | 386/96 |
| 2008/0059986 A1* | 3/2008 | Kalinowski et al. | 725/1 |
| 2008/0219641 A1* | 9/2008 | Sandrew et al. | 386/84 |
| 2008/0291266 A1* | 11/2008 | Burckart et al. | 348/21 |
| 2009/0009605 A1* | 1/2009 | Ortiz | 348/157 |

(Continued)

*Primary Examiner* — Fernando Alcon
(74) *Attorney, Agent, or Firm* — CKC & Partners Co., Ltd.

(57) ABSTRACT

The synchronous display streaming system for multi-view frames is provided. The server provides a plurality of display streamings of a content in a plurality of angles. The server stores accounts. The first electronic device logs in a relation account of the accounts of the server. The second electronic device logs in the relation account of the server. The first electronic device and the second electronic device are grouped in a synchronization operation group. The server provides the plurality of display streamings in the plurality of angles to the first and the second electronic device which log in the relation account respectively and display the frames of the content in the plurality of angles on the first and the second electronic device. Any electronic device of the synchronization operation group performs an operation on one of the electronic devices of the synchronization operation group through the relation account of the server.

12 Claims, 6 Drawing Sheets

(56) References Cited

U.S. PATENT DOCUMENTS

| | | | |
|---|---|---|---|
| 2009/0128631 A1* | 5/2009 | Ortiz | 348/159 |
| 2010/0083324 A1* | 4/2010 | Smith et al. | 725/109 |
| 2010/0220748 A1* | 9/2010 | Inomata | 370/503 |
| 2010/0225811 A1* | 9/2010 | Konvisser | 348/512 |
| 2010/0289900 A1* | 11/2010 | Ortiz | 348/159 |
| 2011/0221902 A1* | 9/2011 | Piccionelli | 348/148 |
| 2012/0017236 A1* | 1/2012 | Stafford et al. | 725/32 |
| 2012/0133772 A1* | 5/2012 | Ortiz | 348/157 |
| 2012/0159026 A1* | 6/2012 | Kataoka et al. | 710/110 |
| 2012/0185890 A1* | 7/2012 | Rouse et al. | 725/25 |
| 2012/0233646 A1* | 9/2012 | Coniglio et al. | 725/78 |
| 2012/0246689 A1* | 9/2012 | Thomas et al. | 725/94 |
| 2013/0061280 A1* | 3/2013 | Bartnik et al. | 725/148 |
| 2013/0073738 A1* | 3/2013 | Reisman | 709/227 |
| 2013/0097649 A1* | 4/2013 | Son et al. | 725/116 |
| 2013/0173742 A1* | 7/2013 | Thomas et al. | 709/217 |
| 2013/0183021 A1* | 7/2013 | Osman | 386/239 |
| 2013/0194437 A1* | 8/2013 | Osman | 348/207.1 |
| 2014/0007170 A1* | 1/2014 | Klappert et al. | 725/97 |
| 2014/0071344 A1* | 3/2014 | Francisco | 348/500 |
| 2014/0093219 A1* | 4/2014 | Trivedi | 386/201 |
| 2014/0095652 A1* | 4/2014 | Bichot et al. | 709/217 |
| 2014/0115639 A1* | 4/2014 | Kim et al. | 725/82 |
| 2014/0149606 A1* | 5/2014 | Liu et al. | 709/248 |
| 2014/0186013 A1* | 7/2014 | Pejaver | 386/343 |
| 2014/0215535 A1* | 7/2014 | Elliott et al. | 725/81 |
| 2014/0280695 A1* | 9/2014 | Sharma et al. | 709/217 |
| 2014/0293013 A1* | 10/2014 | Gong et al. | 348/47 |

* cited by examiner

SYNCHRONOUS DISPLAY STREAMING SYSTEM AND SYNCHRONOUS DISPLAYING METHOD

RELATED APPLICATIONS

This application claims priority to Taiwan Application Serial Number 101145886, filed Dec. 6, 2012, which is herein incorporated by reference.

BACKGROUND

1. Field of Invention

The embodiment of the present invention relates generally to a synchronous display streaming system and method for multi-view frames, more particularly, to a synchronous display streaming system and method for multi-view frames which can be used to perform an operation on a plurality of electrical devices through one of the electrical devices.

2. Description of Related Art

With the progression of the technology, contents of multimedia are abundant with each passing day. If a TV program, a live broadcast for competition, and movies are displayed on a screen in single visual angle, it cannot meet the need of modern people for contents of multimedia.

In conventional technology, even if a user can use lots of displaying devices to display the content in several drawings, the several drawings usually are generated from the frame of the content which is divided into many parts and each of the several drawings is distributed to one of the displaying devices. For example, nine displaying devices can be used to display the frame of the content, but each of the displaying devices is merely used for displaying one of nine parts of the frame. That is to say, even lots of displaying devices can be used to display the same content in several drawings, the displaying devices only display the frame in single visual angle. In addition, there is no operation method for the displaying devices to perform a operation through one of the displaying devices and to change the drawings in the other displaying devices. It is not convenient for user that a operations is performed on one of the displaying devices and the others will not be able to be activated according to the operations in conventional technology.

Furthermore, although there are some video systems can display frames in many angles on different displaying devices, but the video systems need to be cooperated with specialized equipments and systems, for example, a multi-functional director system, a director equipment, and so on, for users to choose the one of the many angles. However, those systems and equipments are expensive and difficult to be operated such that those systems and equipments are not appropriate for general users. Moreover, those systems and equipments are not suitable for the displaying screens or panels which the general users have, such as smart phones, smart phone, PAD screens of computers, tablet PC, or TV.

There has been much effort in trying to find a solution to the aforementioned problems. Nonetheless, there is still a need to improve the existing apparatuses and techniques in the art.

SUMMARY

A synchronous display streaming system and method for multi-view frames are provided, which addresses the problem for the multi-view frames in the electronic devices being not able to be operated by one of the electronic devices.

One aspect of the embodiment of the present invention is to provide a synchronous display streaming system for multi-view frames. The synchronous display streaming system for multi-view frames includes a server, a first electronic device, and a second electronic device. With respect to the structure, the first electronic device electrically is coupled to the server, and the second electronic device electrically is coupled to the server. With respect to the operation, the server is operable to provide a plurality of display streamings of a content in a plurality of angles, wherein the server stores a plurality of accounts. The first electronic device is operable to log in a relation account of the accounts of the server. The second electronic device is operable to log in the relation account of the server. The first electronic device and the second electronic device are grouped in a synchronization operation group. The server provides the plurality of display streamings in the plurality of angles to the first electronic device and the second electronic device grouped in the synchronization operation group which log in the relation account respectively and display the frames of the content in the plurality of angles on the first electronic device and the second electronic device. Any electronic device of the synchronization operation group is used to perform an operation on one of the electronic devices of the synchronization operation group through the relation account of the server.

In one embodiment of the present invention, the first electronic device further provides an operation interface, and the operation interface is used for setting at least one of the first electronic device and the second electronic device as an operation electronic device and providing at least one operation item for generating an operation signal, which enables the first electronic device to perform the operation on the first electronic device or on the second electronic device by transmitting the operation signal through the server.

In another embodiment of the present invention, the synchronous displaying streaming system for multi-view frames further comprises a third electronic device. The third electronic device is electrically coupled to the server. The third electronic device is operable to log in the relation account of the server, wherein the third electronic device, the first electronic device, and the second electronic device are grouped in the synchronization operation group, and any electronic device of the synchronization operation group operates at least two electronic devices of the synchronization operation group through the relation account of the server.

In yet another embodiment of the present invention, the first electronic device is used to display and set a first angle frame which display the content in a first angle, the second electronic device is used to display and set a second angle frame which display the content in a second angle, and when the first electronic device performs a specific operation to the first angle frame, the second electronic device correspondingly performs an alternation operation to the second angle frame displayed by the second electronic device through the relation account of the server.

In still another embodiment of the present invention, the server further determines one of the first electronic device and the second electronic device as a major electronic device and another one of the first electronic device and the second electronic device is a secondary electronic device, wherein the major electronic device is interrupted less easily than the secondary electronic device for communication with the server, and the server provides the display streamings in the plurality of angles to the major electronic device, then the major electronic device transmits the provided display streamings to the secondary electronic device.

In yet another embodiment of the present invention, when the server respectively provides the display streamings in the plurality of angles to the first electronic device and the second electronic device which log in the relation account, the provided display streamings are temporarily stored in the first electronic device and the second electronic device respectively, and when a data volume of the display streamings temporarily stored in the first electronic device and the second electronic device respectively is higher than a predetermined volume, the first electronic device and the second electronic device start displaying the frames of the content in the plurality of angles simultaneously.

In still another embodiment of the present invention, each of the display streamings respectively has a plurality of time labels for marking a time of the display streamings, the first electronic device and the second electronic device display a plurality of frames of the content in the plurality of angles respectively and simultaneously according to the display streamings of the content in the plurality of angles provided by the server and the time labels of the display streamings.

In yet another embodiment of the present invention, the server further determines whether a first play time of a first frame displayed by the first electronic device and a second play time of a second frame displayed by the second electronic device are synchronous according to the time label of the frames displayed by the first electronic device and the second electronic device, and when it is determined that the first play time of the first frame displayed by the first electronic device and the second play time of the second frame displayed by the second electronic device are not synchronous, the server transmits an adjusting signal for adjusting the first play time of the first frame displayed by the first electronic device and the second play time of the second frame displayed by the second electronic device such that the first electronic device and the second electronic device display the frames of the content in the plurality of angles simultaneously.

In another aspect of the embodiment of the present invention, a synchronous displaying method for multi-view frames is provided. The synchronous displaying method for multi-view frames comprises the steps of:

logging in a relation account of a server by a first electronic device;

logging in the relation account of the server by a second electronic device, wherein the first electronic device and the second electronic device are grouped in a synchronization operation group;

providing a plurality of display streamings in a plurality of angles to the first electronic device and the second electronic device grouped in the synchronization operation group which log in the relation account respectively by the server;

displaying the frames of the content in the plurality of angles on the first electronic device and the second electronic device respectively and synchronously; and performing an operation on one of the electronic devices of the synchronization operation group through the relation account of the server by any electronic device of the synchronization operation group.

In one embodiment of the present invention, the synchronous displaying method for multi-view frames further comprises the steps of:

providing an operation interface by the first electronic device, wherein the operation interface is used for setting at least one of the first electronic device and the second electronic device as an operation electronic device and at least one operation item is provided for generating an operation signal; and enabling the first electronic device to perform the operation on the first electronic device or on the second electronic device by transmitting the operation signal through the server.

In another embodiment of the present invention, the synchronous displaying method for multi-view frames further comprises the steps of:

logging in the relation account of the server by a third electronic device, wherein the third electronic device, the first electronic device, and the second electronic device are grouped in the synchronization operation group; and operating at least two electronic devices of the synchronization operation group through the relation account of the server by any electronic device of the synchronization operation group.

In yet another embodiment of the present invention, the step of displaying the frames of the content in the plurality of angles on the first electronic device and the second electronic device synchronously comprises:

displaying and setting a first angle frame which display the content in a first angle by the first electronic device;

displaying and setting a second angle frame which display the content in a second angle by the second electronic device;

wherein the synchronous displaying method for multi-view frames further comprises:

when performing a specific operation to the first angle frame through the relation account of the server by the first electronic device, performing an alternation operation to the second angle frame displayed by the second electronic device correspondingly by the second electronic device.

In still another embodiment of the present invention, the synchronous displaying method for multi-view frames further comprises the steps of:

determining one of the first electronic device and the second electronic device as a major electronic device by the server, wherein another one of the first electronic device and the second electronic device is a secondary electronic device, wherein the major electronic device is harder to be interrupted than the secondary electronic device for communication with the server;

providing the display streamings in the plurality of angles to the major electronic device by the server; and transmitting the provided display streamings to the secondary electronic device by the major electronic device.

In yet another embodiment of the present invention, the step of providing the display streamings in the plurality of angles to the first electronic device and the second electronic device of the synchronization operation group which log in the relation account respectively by the server comprises:

when providing the display streamings in the plurality of angles to the first electronic device and the second electronic device which log in the relation account respectively by the server, temporarily storing the provided display streamings in the first electronic device and the second electronic device respectively;

wherein the step of displaying the frames of the content in the plurality of angles on the first electronic device and the second electronic device to synchronously comprises:

when a data volume of the display streaming temporarily stored in the first electronic device and the second electronic device respectively being higher than a predetermined volume, the first electronic device and the second electronic device starting displaying the frames of the content in the plurality of angles simultaneously.

In still another embodiment of the present invention, each of the display streamings respectively has a plurality of time labels for marking a time of the display streamings, wherein the step of displaying the frames of the content in the plurality of angles on the first electronic device and the second electronic device respectively and synchronously comprises:

displaying a plurality of frames of the content in the plurality of angles respectively and simultaneously in the first electronic device and the second electronic device according to the display streamings of the content in the plurality of angles provided by the server and the time label of the frame displaying streaming by the first electronic device and the second electronic device.

In yet another embodiment of the present invention, the synchronous displaying method for multi-view frames further comprises the steps of:

determining whether a first play time of a first frame displayed by the first electronic device and a second play time of a second frame displayed by the second electronic device are synchronous by the server according to the time label of the frames displayed by the first electronic device and the second electronic device; and when it being determined that the first play time of the first frame displayed by the first electronic device and the second play time of the second frame displayed by the second electronic device are not synchronous, the server transmitting an adjusting signal for adjusting the first play time of the first frame displayed by the first electronic device and the second play time of the second frame displayed by the second electronic device such that the first electronic device and the second electronic device display the frames of the content in the plurality of angles simultaneously.

As a result, the embodiments of the present invention provide a synchronous display streaming system and method for multi-view frames, which address the problem of a frame in single visual angle being not able to meet the need of modern people for contents of multimedia.

BRIEF DESCRIPTION OF THE DRAWINGS

The invention can be more fully understood by reading the following detailed description of the embodiments, with reference made to the accompanying drawings as follows.

DETAILED DESCRIPTION

The present invention is more particularly described in the following examples that are intended as illustrative only since numerous modifications and variations therein will be apparent to those skilled in the art. Various embodiments of the invention are now described in detail. Referring to the drawings, like numbers indicate like components throughout the views.

The phrases "coupling" or "connecting" used herein both refer to that two or more elements physically, communicatively or electrically contact with each other directly or indirectly. They also refer to that two or more elements interoperate or interact with each other. The electrical device described in the present invention can be a computer system or a electrical system, for example, a hand-held device, a portable device, a personal digital assistant (PDA), a multi-processor system, microprocessor-based or programmable consumer electronic, network computers, minicomputers, mainframes, and so on.

Figure 1:
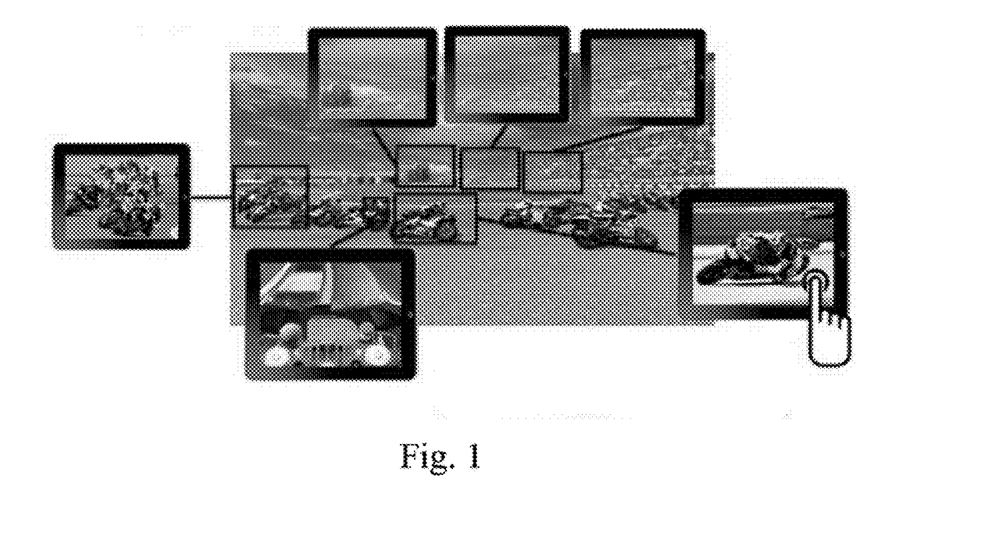
FIG. 1 schematically shows a diagram of multi-view frames according to embodiments of the present invention.

FIG. 1 schematically shows a diagram of multi-view frames according to embodiments of the present invention. As shown in FIG. 1, this is multi-view frames of a car racing for live broadcast. In a regular car racing, there will be a plurality of cameras set up in several blocks of a racetrack for capturing frames from several blocks of the racetrack, and the frames will be used to form multi-view frames for reporting the situation of the car racing particularly.

In general, a situation of users watching the car racing in multi-view frames is described as following. Although the users want to know the situations of the car racing in several blocks of the racetrack, the users cannot view each frames captured from the several blocks of the racetrack because of a conventional displaying device being able to display one frame at the same time. As such, the embodiment of the present invention provides a synchronous display streaming system for multi-view frames such that electronic devices can display a plurality of frames of the same content (for example, the same car racing) in a plurality of angles as shown in FIG. 1. The detailed implementation of the embodiment of the present invention will be described in descriptions of FIGS. 2A and 2B as below.

Figure 2A:
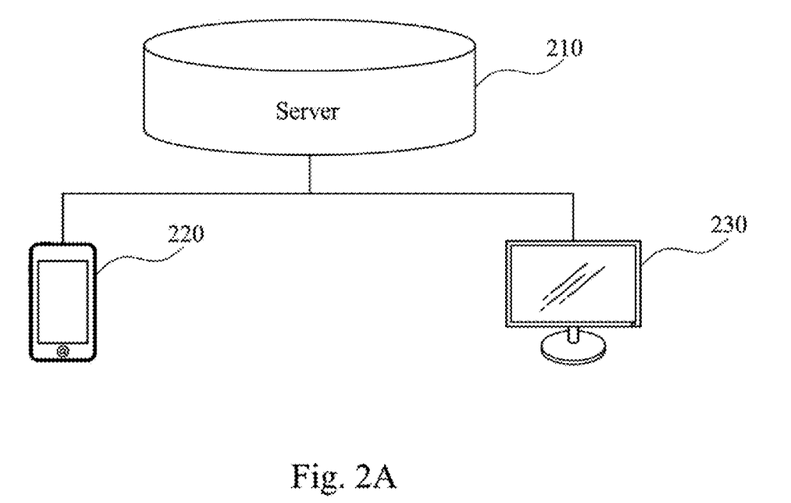
FIG. 2A schematically shows a diagram of a synchronous display streaming system for multi-view frames according to embodiments of the present invention.

FIG. 2A schematically shows a diagram of a synchronous display streaming system for multi-view frames according to embodiments of the present invention. The synchronous display streaming system for multi-view frames comprises a server 210, a first electronic device 220, and a second electronic device 230. With respect to the structure, the first electronic device 220 is electrically coupled to the server 210, and the second electronic device 230 is also electrically coupled to the server 210.

With respect to the operation, the server 210 is operable to provide a plurality of display streamings of a content in a plurality of angles, wherein the server 210 stores a plurality of accounts. The first electronic device 220 logs in a relation account of the accounts of the server 210. The second electronic device 230 logs in the relation account of the server 210. The first electronic device 220 and the second electronic device 230 are grouped in a synchronization operation group. The server 210 provides the plurality of display streamings in the plurality of angles to the first electronic device 220 and the second electronic device 230 which log in the relation account respectively, and the frames of the content in the plurality of angles can be used to display on the first electronic device 220 and the second electronic device 230 in different angles respectively and synchronously. The first electronic device 220 is used to perform operations on the first electronic device 220 and the second electronic device 230 simultaneously through the relation account of the server 210.

When implementing the present invention, the first electronic device 220 can be but not limited to a smart phone, the second electronic device 230 can be but not limited to a computer (with screen), and the server 210 provides the plurality of display streamings of a car racing in a plurality of angles. In operation, a user uses the smart phone 220 to log in a first account of the server 210. At the same time, the user can use the computer 230 to log in the first account of the server 210. The server 210 will group the smart phone 220 and the computer 230, and the smart phone 220 and the computer 230 can be related through the first account; therefore, the first account is called a relation account.

Subsequently, the server 210 respectively provides the plurality of display streamings in the plurality of angles to the smart phone 220 and the computer 230 which log in the relation account respectively, and the frames of the car racing in the plurality of angles are displayed on the smart phone 220 and the computer 230 simultaneously in different angles. In one embodiment of the present invention, the server 210 can respectively transmit the display streamings to the smart phone 220 and the computer 230 through different communication networks/connections. In other embodiments, the server 210 can transmit the display streamings to the smart phone 220 first, and the smart phone 220 then transmits the display streaming to the computer 230 through another local area network or near field communication. In another embodiment, the server 210 can transmit the display streamings to a set top box for communication (for example, an ADSL set top box, Cable TV set top box, and so on), and the set top box then transmits the display streamings to the smart phone 220 and the computer 230 simultaneously.

In addition, the smart phone 220 performs an operation on the smart phone 220 and the computer 230 through the first account of the server 210. Said operation can be one of displaying a plurality of display streamings of the content in a plurality of angles, stopping displaying frames, fast forwarding, replaying, slow forward, and so on. However, said embodiments are merely used to express several implementations of the present invention, and the scope of the present application is not intended to be limited to the embodiments. It should be understood by those skilled in the art that other embodiments without departing from the spirit and scope of the invention as defined by the appended claim can remain within the scope of the present invention.

As such, the embodiment of the present invention provides a synchronous display streaming system for multi-view frames, which address the problem for a frame in single visual angle being not able to meet the need of modern people for contents of multimedia.

In addition, the users can use one of the electronic devices of the synchronization operation group to perform the operation on the others of the synchronization operation group through the relation account of the server, such that the frames displayed by the electronic devices of the synchronization operation group can be adjusted by the one of the electronic devices of the synchronization operation group.

In another embodiment of the present invention, the smart phone 220 further provides an operation interface (not shown in FIG. 2A), and the operation interface is used for setting at least one of the smart phone 220 and the computer 230 as an operation electronic device, and for providing at least one operation item. For example, the smart phone 220 is used to set the computer 230 as the operation electronic device, and then the smart phone 220 generates at least one operation item for the smart phone 220 to perform an operation. Subsequently, the smart phone 220 can perform an operation by the at least one the operation item to generate the operation signal, the operation signal is transmitted to the computer 230 through the server 210, and the computer 230 performs an operation based on the operation signal.

In still another embodiment of the present invention, different electronic devices can be set to display frames in a plurality of angles respectively. When one of the frames in the plurality of angles is operated, the frames displayed by the others will be alternatively operated. For example, the smart phone 220 is used to display a first angle frame in the car racing and is set to correspond to a first angle, and the computer 230 is used to display a second angle frame in the car racing and is set to correspond to a second angle. When the smart phone 220 performs a specific operation to the first angle frame, such as the first angle frame displayed on the smart phone 220 is changed into the second angle frame, the computer 230 correspondingly performs an alternation operation to the second angle frame displayed by the computer 230 through the first account of the server 210, such as the second angle frame displayed on the computer 230 is changed into the first angle frame or other angle frame. In another embodiment, when the first angle frame displayed one the smart phone 220 is stopped, the second angle frame displayed on the computer 230 is also stopped. However, the scope of the present invention is not intended to be limited in this regard, and the embodiment is merely used to express an implementation of the present invention.

In the synchronous display streaming system for multi-view frames, the ways of the electronic devices to connect with the server 210 are different such that the frames displayed by the electronic devices maybe not synchronous. For solving said phenomenon, the present invention provides several solutions as below.

One of the solutions is that the server 210 determines one of the smart phone 220 and the computer 230 as a major electronic device and another one of the smart phone 220 and the computer 230 is a secondary electronic device, wherein the major electronic device is interrupted less easily than the secondary electronic device for communication with the server 210. The server 210 provides the display streamings in the plurality of angles to the major electronic device, the major electronic device then transmits the provided display streamings to the secondary electronic device. As such, if the major electronic device receives display streamings in the plurality of angles and transmits the provided display streaming to the secondary electronic device, the probability of non-synchronous phenomenon of the frame displayed on the major electronic device and another frame displayed on the secondary electronic device is reduced.

Another one of the solutions is that when the server 210 respectively provides the display streamings in the plurality of angles to the smart phone 220 and the computer 230 which log in the first account, the provided display streamings are temporarily stored in the smart phone 220 and the computer 230 respectively, and when a data volume of the display streamings temporarily stored in the smart phone 220 and the computer 230 respectively is higher than a predetermined volume, the smart phone 220 and the computer 230 start displaying the frames of the content in different angles simultaneously. As such, the smart phone 220 and the computer 230 temporarily store a data volume of the display streamings such that the smart phone 220 and the computer 230 can display the frames at the same time synchronously. Meanwhile, the smart phone 220 and the computer 230 can receive and temporarily store the display streamings. Therefore, the probability of non-synchronous phenomenon of the frame displayed on the major electronic device and another frame displayed on the secondary electronic device is reduced.

Still another one of the solutions is that each of the display streamings respectively has a plurality of time labels for marking a time of the display streamings, the smart phone 220 and the computer 230 display a plurality of frames of the content in the plurality of angles respectively and simultaneously according to the display streamings of the content in the plurality of angles provided by the server 210 and the time labels of the display streamings.

In addition, the server 210 determines whether a first play time of a first frame displayed by the smart phone 220 and a second play time of a second frame displayed by the computer 230 are synchronous according to the time label of the frames displayed by the smart phone 220 and the computer 230, and when it is determined that the first play time of the first frame displayed by the smart phone 220 and the second play time of the second frame displayed by the computer 230 are not synchronous, the server 210 transmits an adjusting signal for adjusting the first play time of the first frame displayed by the smart phone 220 and the second play time of the second frame displayed by the computer 230 such that the smart phone 220 and the computer 230 display the frames of the content in the plurality of angles simultaneously. As such, when the first play time of the first frame displayed by the smart phone 220 and the second play time of the second frame displayed by the computer 230 are not synchronous, the above-mentioned operation mechanism can adjust the first play time and the second play time such that the smart phone 220 and the computer 230 can simultaneously display the frames of the content in the plurality of angles. Therefore, the non-synchronous phenomenon of the frame displayed on the smart phone 220 and another frame displayed on the computer 230 can be solved.

Figure 2B:
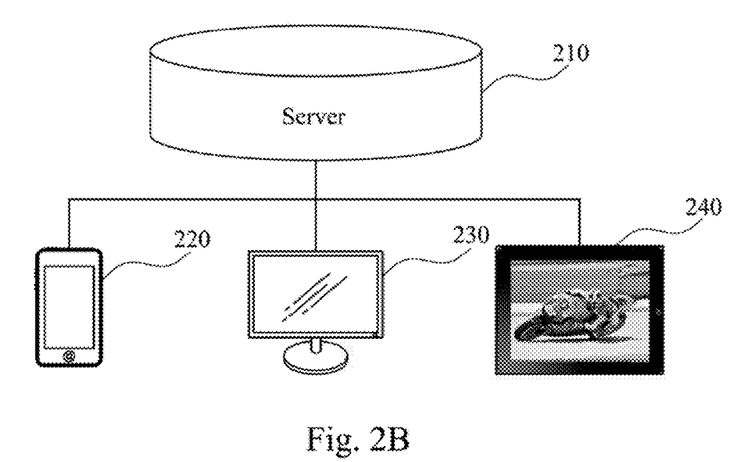
FIG. 2B schematically shows a diagram of a synchronous display streaming system for multi-view frames according to embodiments of the present invention.

In another embodiment of the present invention, the synchronous display streaming system for multi-view frames further comprises a third electronic device, and this embodiment of the present invention is shown in FIG. 2B. When implementing the present invention, the third electronic device can be but not limited to a tablet computer 240. The tablet computer 240 can be electrically coupled to the server 210, and the tablet computer 240 is operable to log in the first account of the server 210. The smart phone 220, the computer 230, and the tablet computer 240 are grouped in the synchronization operation group.

In said embodiment, the smart phone 220 can perform operations to the smart phone 220 and the computer 230 at the same time through the first account of the server; that is to say, when the smart phone 220 and the computer 230 are grouped in the synchronization operation group, any electronic device of the synchronization operation group (for example, the smart phone 220, the computer 230 or the tablet computer 240) operates at least two electronic devices of the synchronization operation group through the first account of the server 210. However, the scope of the present invention is not intended to be limited in this regard, and those skilled in the art can selectively adopt at least two electronic devices of the group consisting of the smart phone 220, the computer 230, and the tablet computer 240 to display frames in the plurality of angles depend on actual requirements. The other electronic device can perform operations on at least two electronic devices of the synchronization operation group through the first account of the server 210.

Figure 3:
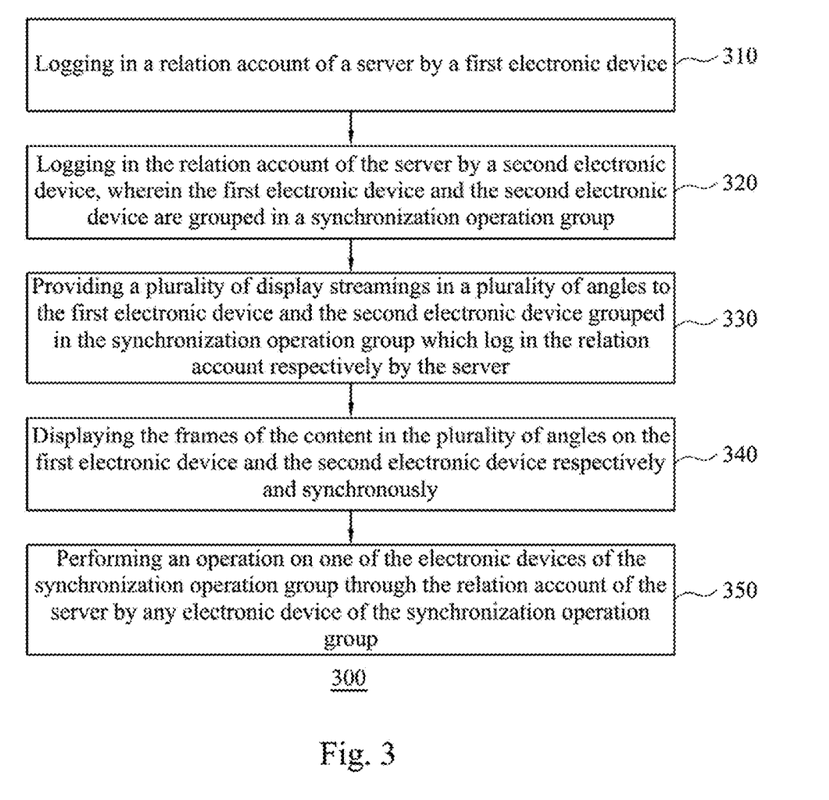
FIG. 3 schematically shows a flow diagram of a synchronous display streaming method for multi-view frames according to embodiments of the present invention.

FIG. 3 schematically shows a flow diagram of a synchronous display streaming method for multi-view frames according to embodiments of the present invention. As shown in FIG. 3, the synchronous displaying method 300 for multi-view frames comprises the steps of:

step 310: logging in a relation account of a server by a first electronic device;

step 320: logging in the relation account of the server by a second electronic device wherein the first electronic device and the second electronic device are grouped in a synchronization operation group;

step 330: providing a plurality of display streamings in a plurality of angles to the first electronic device and the second electronic device grouped in the synchronization operation group which log in the relation account respectively by the server;

step 340: displaying the frames of the content in the plurality of angles on the first electronic device and the second electronic device respectively and synchronously; and step 350: performing an operation on one of the electronic devices of the synchronization operation group through the relation account of the server by any electronic device of the synchronization operation group.

For understanding the embodiment of the present invention easier, reference is made to both FIGS. 2 and 3. When implementing the present invention, the first electronic device 220 can be but not limited to a smart phone, the second electronic device 230 can be but not limited to a computer, and the server 210 provides the plurality of display streamings of a car racing in the plurality of angles. In step 310, the smart phone 220 is operated to log in a first account of the server 210. Subsequently, in step 320, the computer 230 is operated to log in the first account of the server 210. At this time, the server 210 will group the smart phone 220 and the computer 230, and the smart phone 220 and the computer 230 can be related through the first account; therefore, the first account is called a relation account.

Subsequently, in step 330, the server 210 is operated to respectively provide the plurality of display streamings in the plurality of angles to the smart phone 220 and the computer 230 which log in the relation account and the frames of the car racing in the plurality of angles is displayed on the smart phone 220 and the computer 230 simultaneously and respectively (step 340). In addition, in step 350, the smart phone 220 is used to perform operations on the smart phone 220 and the computer 230 through the first account of the server 210 simultaneously.

Figure 4:
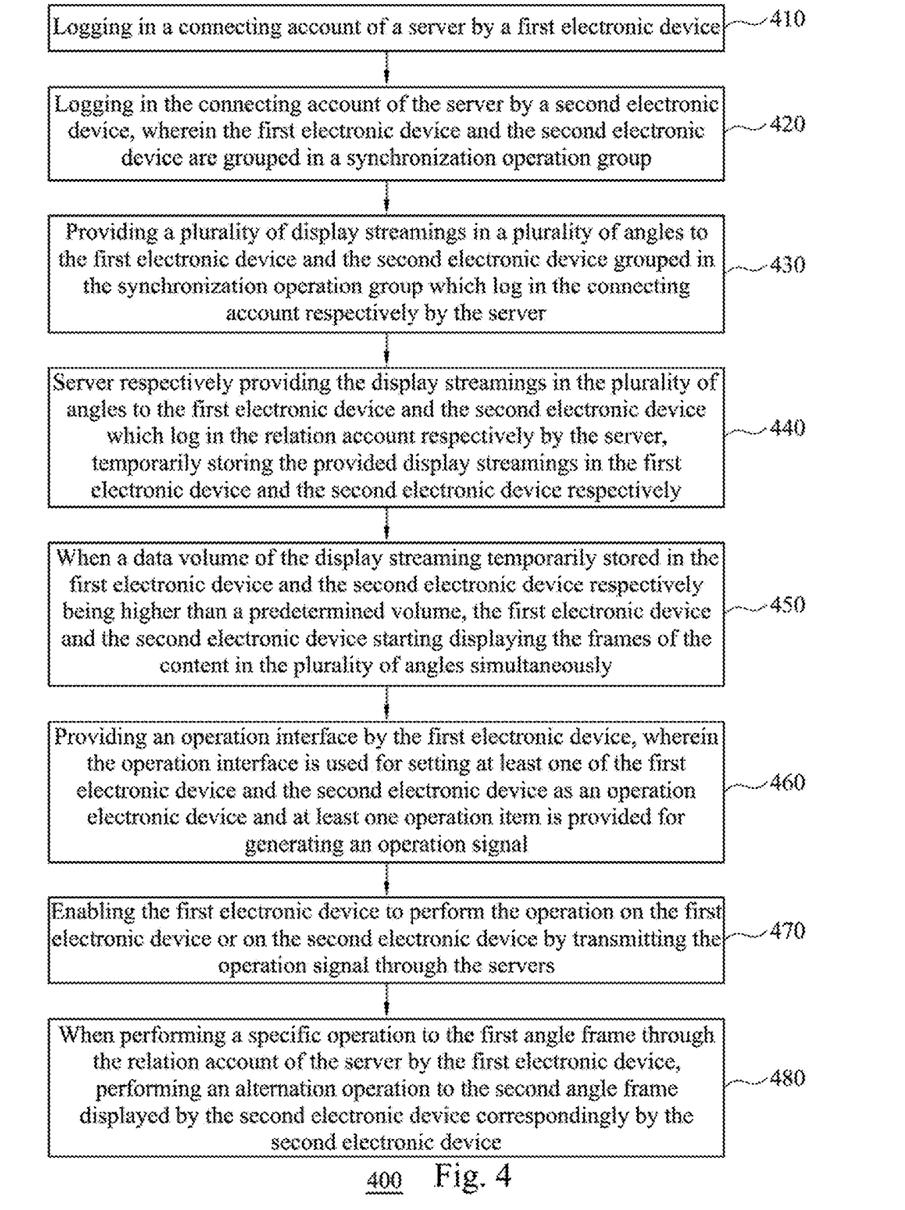
FIG. 4 schematically shows a flow diagram of a synchronous display streaming method for multi-view frames according to embodiments of the present invention.

FIG. 4 schematically shows a flow diagram of a synchronous display streaming method for multi-view frames according to embodiments of the present invention. The steps 410 to 430 of the synchronous display streaming method 400 for multi-view frames are similar to the steps of 310 to 330 of the synchronous display streaming method 300 for multi-view frames, therefore, the steps 410 to 430 are omitted herein. Moreover, the synchronous display streaming method 400 for multi-view frames further comprises the steps of:

step 440: server respectively providing the display streamings in the plurality of angles to the first electronic device and the second electronic device which log in the relation account respectively by the server, temporarily storing the provided display streamings in the first electronic device and the second electronic device respectively;

step 450: when a data volume of the display streaming temporarily stored in the first electronic device and the second electronic device respectively being higher than a predetermined volume, the first electronic device and the second electronic device starting displaying the frames of the content in the plurality of angles simultaneously;

step 460: providing an operation interface by the first electronic device, wherein the operation interface is used for setting at least one of the first electronic device and the second electronic device as an operation electronic device and at least one operation item is provided for generating an operation signal;

step 470: enabling the first electronic device to perform the operation on the first electronic device or on the second electronic device by transmitting the operation signal through the servers; and step 480: when performing a specific operation to the first angle frame through the relation account of the server by the first electronic device, performing an alternation operation to the second angle frame displayed by the second electronic device correspondingly by the second electronic device.

In another embodiment of the present invention, in the step 460, the second electronic device can also provide the operation interface. In step 470, the second electronic device can perform the operation according to the operation signal and transmit the operation signal to the first electronic device through the server. In step 480, when the second electronic device is operated to perform the specific operation to the second angle frame through the relation account of the server, the first electronic device will perform the alternation operation to the first angle frame accordingly.

For understanding the embodiment of the present invention easier, reference is made to both FIGS. 2 and 4. In step 440, when the server 210 respectively provides the display streamings in the plurality of angles to the smart phone 220 and the computer 230 which log in the first account, the provided display streamings are temporarily stored in the smart phone 220 and the computer 230 respectively. Subsequently, in step 450, when a data volume of the display streamings temporarily stored in the smart phone 220 and the computer 230 respectively is higher than a predetermined volume, the smart phone 220 and the computer 230 are operated to start displaying the frames of the content in the plurality of angles simultaneously.

Subsequently, in step 460, the smart phone 220 is operated to provide an operation interface (not shown), and the operation interface is used for setting at least one of the smart phone 220 and the computer 230 as an operation electronic device and providing at least one operation item. For example, the smart phone 220 is used to set the computer 230 as the operation electronic device; meanwhile, the smart phone 220 generates an operation signal. In step 470, the smart phone 220 can perform an operation to the operation item to generate the operation signal, and the operation signal is transmitted to the computer 230 through the server 210 for the computer 230 to perform operations based on the operation signal.

In step 480, the smart phone 220 is used to display a first angle frame in the car racing and is set to correspond to a first angle, and the computer 230 is used to display a second angle frame in the car racing and is set to correspond to a second angle. When the smart phone 220 performs a specific operation to the first angle frame, such as the first angle frame displayed on the smart phone 220 is changed into the second angle frame, the computer 230 correspondingly performs alternation operations to the second angle frame displayed by the computer 230 through the first account of the server 210 by the smart phone 220, such as the second angle frame displayed on the computer 230 is changed into the first angle frame. However, the scope of the present invention is not intended to be limited in this regard, and the embodiment is only used to describe one of the implementations of the present invention.

In one embodiment, the synchronous displaying method for multi-view frames further comprises the steps of: logging in the relation account of the server by a third electronic device, wherein the third electronic device, the first electronic device, and the second electronic device are grouped in the synchronization operation group; and operating at least two electronic devices of the synchronization operation group through the relation account of the server by any electronic device of the synchronization operation group. For understanding the embodiment of the present invention easier, reference is made to FIG. 2 for describing the steps as shown above.

In the steps, the third electronic device can be but not limited to a tablet computer 240. The tablet computer 240 is operable to log in the first account of the server 210. In addition, the smart phone 220, the computer 230, and the tablet computer 240 are grouped in the synchronization operation group. Subsequently, any electronic device (the smart phone 220, the computer 230, or the tablet computer 240) of the synchronization operation group operates at least two electronic devices of the synchronization operation group through the relation account of the server 210. However the scope of the present invention is not intended to be limited in this regard, those skilled in the art can selectively adopt at least two electronic devices of the group consisting of the smart phone 220, the computer 230, and the tablet computer 240 to display frames in the plurality of angles depend on actual requirements. The other electronic device can perform operations on at least two electronic devices of the synchronization operation group through the first account of the server 210.

In the synchronous display streaming method for multi-view frames, the ways of the electronic devices to connect with the server 210 are different such that the frames displayed by the electronic devices are not synchronous. For solving said phenomenon, the present invention provides several solutions as shown in FIGS. 5 and 6.

Figure 5:
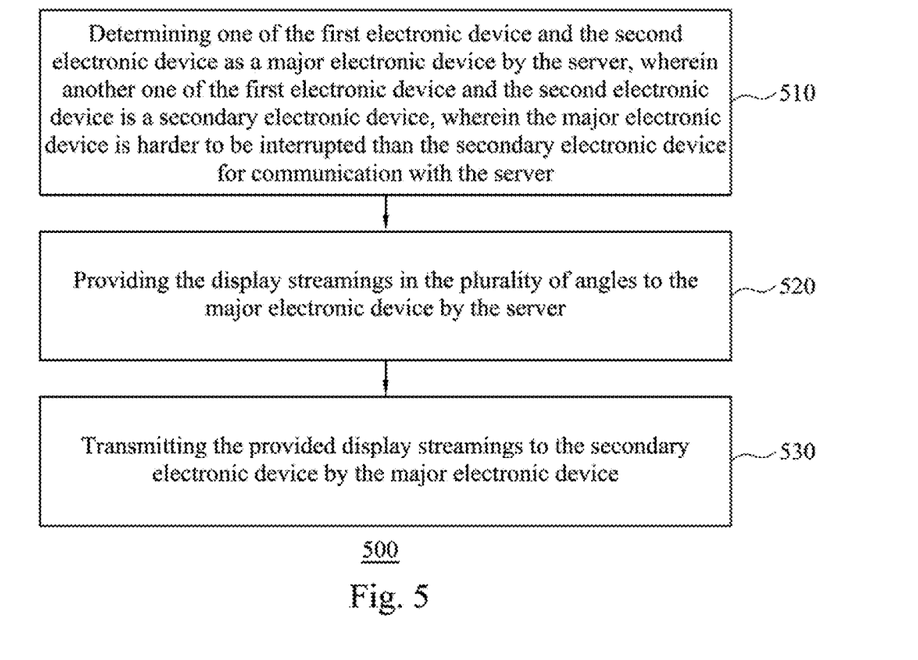
FIG. 5 schematically shows a flow diagram of a synchronous display streaming method for multi-view frames according to embodiments of the present invention.
Figure 6:
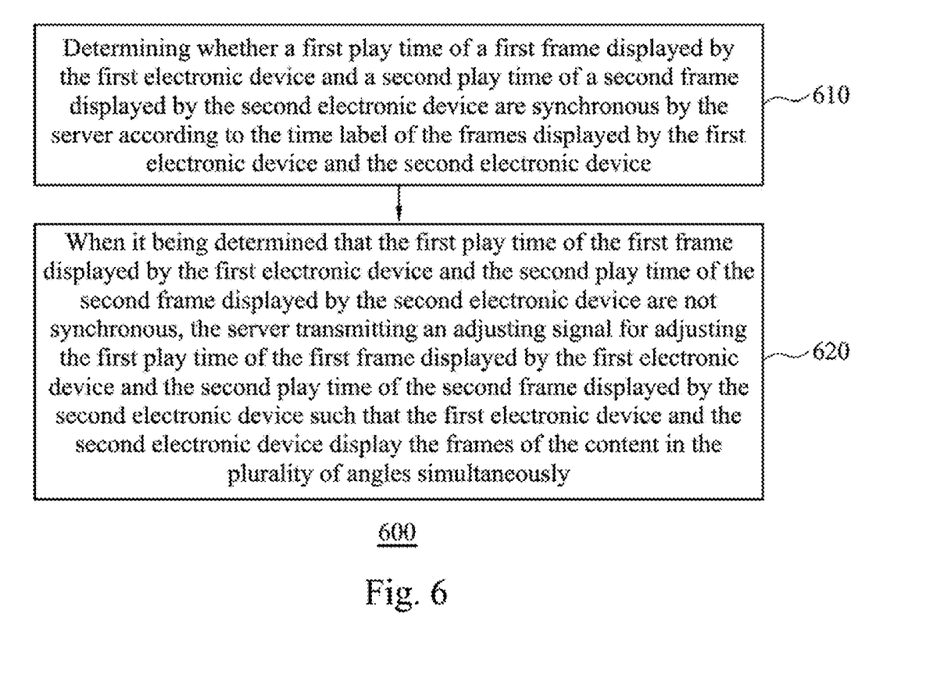
FIG. 6 schematically shows a flow diagram of a synchronous display streaming method for multi-view frames according to embodiments of the present invention.

FIG. 5 schematically shows a flow diagram of synchronous display streaming method for multi-view frames according to embodiments of the present invention. The synchronous display streaming method 500 for multi-view frames comprise the steps of:

step 510: determining one of the first electronic device and the second electronic device as a major electronic device by the server, wherein another one of the first electronic device and the second electronic device is a secondary electronic device, wherein the major electronic device is harder to be interrupted than the secondary electronic device for communication with the server;

step 520: providing the display streamings in the plurality of angles to the major electronic device by the server; and step 530: transmitting the provided display streamings to the secondary electronic device by the major electronic device.

For understanding the embodiment of the present invention easier, reference is made to both FIGS. 2 and 5. In step 510, the server 210 is operated to determine one of the smart phone 220 and the computer 230 as a major electronic device and another one of the smart phone 220 and the computer 230 is a secondary electronic device, wherein the major electronic device is harder to be interrupted than the secondary electronic device for communication with the server 210. In step 520, the server 210 is operated to provide the display streamings in the plurality of angles to the major electronic device Subsequently, in step 530, the major electronic device is operated to transmit the provided display streamings to the secondary electronic device. As such, if the major electronic device receives display streamings in a plurality of angles and transmits the provided display streaming to the secondary electronic device, the probability of non-synchronous phenomenon of the frame displayed on the major electronic device and another frame displayed on the secondary electronic device is reduced.

FIG. 6 schematically shows a flow diagram of a synchronous display streaming method for multi-view frames according to embodiments of the present invention. The synchronous displaying method 600 for multi-view frames comprises the steps of:

step 610: determining whether a first play time of a first frame displayed by the first electronic device and a second play time of a second frame displayed by the second electronic device are synchronous by the server according to the time label of the frames displayed by the first electronic device and the second electronic device: and step 620: when it being determined that the first play time of the first frame displayed by the first electronic device and the second play time of the second frame displayed by the second electronic device are not synchronous, the server transmitting an adjusting signal for adjusting the first play time of the first frame displayed by the first electronic device and the second play time of the second frame displayed by the second electronic device such that the first electronic device and the second electronic device display the frames of the content in the plurality of angles simultaneously.

For understanding the embodiment of the present invention easier, reference is made to both FIGS. 2 and 6. In step 610, the server 210 is operated to determine whether a first play time of a first frame displayed by the smart phone 220 and a second play time of a second frame displayed by the computer 230 are synchronous according to the time label of the frames displayed by the smart phone 220 and the computer 230. Subsequently, in step 620, when it is determined that the first play time of the first frame displayed by the smart phone 220 and the second play time of the second frame displayed by the computer 230 are not synchronous, the server 210 transmits an adjusting signal for adjusting the first play time of the first frame displayed by the smart phone 220 and the second play time of the second frame displayed by the computer 230 such that the smart phone 220 and the computer 230 display the frames of the content in the plurality of angles simultaneously. As such, when the first play time of the first frame displayed by the smart phone 220 and the second play time of the second frame displayed by the computer 230 are not synchronous, the above-mentioned operation mechanism can adjust the first play time and the second play time such that the smart phone 220 and the computer 230 can simultaneously display the frames of the content in the plurality of angles. Therefore, the non-synchronous phenomenon of the frame displayed on the smart phone 220 and another frame displayed on the computer 230 can be solved.

Those having skill in the art will appreciate that the synchronous displaying method for multi-view frames can be performed with software, hardware, and/or firmware. For example, if an implementer determines that speed and accuracy are paramount, the implementer may opt for a mainly hardware and/or firmware implementation; alternatively, if flexibility is paramount, the implementer may opt for a mainly software implementation; or, yet again alternatively, the implementer may opt for some combination of hardware, software, and/or firmware. Those skilled in the art will recognize that optical aspects of implementation will typically employ optically oriented hardware, software, and or firmware.

In addition, those skilled in the art will appreciate that each of the steps of the synchronous displaying method for multi-view frames named after the function thereof is merely used to describe the technology in the embodiment of the present invention in detail but not limited to. Therefore, combining the steps of said method into one step, dividing the steps into several steps, or rearranging the order of the steps is within the scope of the embodiment in the present invention.

In view of the foregoing embodiments of the present invention, many advantages of the present invention are now apparent. The embodiment of the present invention provides the synchronous display streaming system or method for multi-view frames, which address the problem of a frame in single visual angle being not able to meet the need of modern people for contents of multimedia. In addition, the users can use one of the electronic device of the synchronization operation group to perform the operation on the others of the synchronization operation group through the relation account of the server such that the frames displayed by the electronic devices of the synchronization operation group can be adjusted by the one of the electronic devices of the synchronization operation group.

It will be understood that the above description of embodiments is given by way of example only and that various modifications may be made by those with ordinary skill in the art. The above specification, examples and data provide a complete description of the structure and use of exemplary embodiments of the invention. Although various embodiments of the invention have been described above with a certain degree of particularity, or with reference to one or more individual embodiments, those with ordinary skill in the art could make numerous alterations to the disclosed embodiments without departing from the spirit or scope of this invention, and the scope thereof is determined by the claims that follow.

What is claimed is:

1. A synchronous display streaming system for multi-view frames, comprising:

a server being operable to provide a plurality of display streamings of a content in a plurality of angles, wherein the server stores a plurality of accounts;

a first electronic device electrically coupled to the server for logging in a relation account of the accounts of the server; and a second electronic device electrically coupled to the server for logging in the relation account of the server, wherein the first electronic device and the second electronic device are grouped in a synchronization operation group;

wherein the server provides the plurality of display streamings in the plurality of angles to the first electronic device and the second electronic device grouped in the synchronization operation group which log in the relation account respectively and display the frames of the content in the plurality of angles on the first electronic device and the second electronic device; and wherein any electronic device of the synchronization operation group is used to perform an operation on one of the electronic devices of the synchronization operation group through the relation account of the server, wherein each of the display streamings respectively has a plurality of time labels for marking a time of the display streamings, the first electronic device and the second electronic device display a plurality of frames of the content in the plurality of angles respectively and simultaneously according to the display streamings of the content in the plurality of angles provided by the server and the time labels of the display streamings, wherein the server further determines whether a first play time of a first frame displayed by the first electronic device and a second play time of a second frame displayed by the second electronic device are synchronous according to the time label of the frames displayed by the first electronic device and the second electronic device, and when it is determined that the first play time of the first frame displayed by the first electronic device and the second play time of the second frame displayed by the second electronic device are not synchronous, the server transmits an adjusting signal for adjusting the first play time of the first frame displayed by the first electronic device and the second play time of the second frame displayed by the second electronic device such that the first electronic device and the second electronic device display the frames of the content in the plurality of angles simultaneously.

2. The synchronous displaying streaming system for multi-view frames according to claim 1, wherein the first electronic device further provides an operation interface, and the operation interface is used for setting at least one of the first electronic device and the second electronic device as an operation electronic device and providing at least one operation item for generating an operation signal, which enables the first electronic device to perform the operation on the first electronic device or on the second electronic device by transmitting the operation signal through the server.

3. The synchronous displaying streaming system for multi-view frames according to claim 1, further comprising a third electronic device, wherein the third electronic device is electrically coupled to the server, and the third electronic device is operable to log in the relation account of the server, wherein the third electronic device, the first electronic device, and the second electronic device are grouped in the synchronization operation group, and any electronic device of the synchronization operation group operates at least two electronic devices of the synchronization operation group through the relation account of the server.

4. The synchronous displaying streaming system for multi-view frames according to claim 1, wherein the first electronic device is used to display and set a first angle frame which display the content in a first angle, the second electronic device is used to display and set a second angle frame which display the content in a second angle, and when the first electronic device performs a specific operation to the first angle frame, the second electronic device correspondingly performs an alternation operation to the second angle frame displayed by the second electronic device through the relation account of the server.

5. The synchronous displaying streaming system for multi-view frames according to claim 1, wherein the server further determines one of the first electronic device and the second electronic device as a major electronic device and another one of the first electronic device and the second electronic device is a secondary electronic device, wherein the major electronic device is interrupted less easily than the secondary electronic device for communication with the server, and the server provides the display streamings in the plurality of angles to the major electronic device, then the major electronic device transmits the provided display streamings to the secondary electronic device.

6. The synchronous displaying streaming system for multi-view frames according to claim 1, wherein when the server respectively provides the display streamings in the plurality of angles to the first electronic device and the second electronic device which log in the relation account, the provided display streamings are temporarily stored in the first electronic device and the second electronic device respectively, and when a data volume of the display streamings temporarily stored in the first electronic device and the second electronic device respectively is higher than a predetermined volume, the first electronic device and the second electronic device start displaying the frames of the content in the plurality of angles simultaneously.

7. A synchronous displaying method for multi-view frames, comprising:
   logging in a relation account of a server by a first electronic device;
   logging in the relation account of the server by a second electronic device, wherein the first electronic device and the second electronic device are grouped in a synchronization operation group;
   providing a plurality of display streamings in a plurality of angles to the first electronic device and the second electronic device grouped in the synchronization operation group which log in the relation account respectively by the server;
   displaying the frames of the content in the plurality of angles on the first electronic device and the second electronic device respectively and synchronously; and
   performing an operation on one of the electronic devices of the synchronization operation group through the relation account of the server by any electronic device of the synchronization operation group,
   wherein each of the display streamings respectively has a plurality of time labels for marking a time of the display streamings, wherein the step of displaying the frames of the content in the plurality of angles on the first electronic device and the second electronic device respectively and synchronously comprises:
      displaying a plurality of frames of the content in the plurality of angles respectively and simultaneously in the first electronic device and the second electronic device according to the display streamings of the content in the plurality of angles provided by the server and the time label of the frame displaying streaming by the first electronic device and the second electronic device,
   wherein the synchronous displaying method further comprises:
      determining whether a first play time of a first frame displayed by the first electronic device and a second play time of a second frame displayed by the second electronic device are synchronous by the server according to the time label of the frames displayed by the first electronic device and the second electronic device; and
      when it being determined that the first play time of the first frame displayed by the first electronic device and the second play time of the second frame displayed by the second electronic device are not synchronous, the server transmitting an adjusting signal for adjusting the first play time of the first frame displayed by the first electronic device and the second play time of the second frame displayed by the second electronic device such that the first electronic device and the second electronic device display the frames of the content in the plurality of angles simultaneously.

8. The synchronous displaying method for multi-view frames according to claim 7, further comprising:
   providing an operation interface by the first electronic device, wherein the operation interface is used for setting at least one of the first electronic device and the second electronic device as an operation electronic device and at least one operation item is provided for generating an operation signal; and
   enabling the first electronic device to perform the operation on the first electronic device or on the second electronic device by transmitting the operation signal through the server.

9. The synchronous displaying method for multi-view frames according to claim 7, further comprising:
- logging in the relation account of the server by a third electronic device, wherein the third electronic device, the first electronic device, and the second electronic device are grouped in the synchronization operation group; and
- operating at least two electronic devices of the synchronization operation group through the relation account of the server by any electronic device of the synchronization operation group.

10. The synchronous displaying method for multi-view frames according to claim 7, wherein the step of displaying the frames of the content in the plurality of angles on the first electronic device and the second electronic device synchronously comprises:
- displaying and setting a first angle frame which display the content in a first angle by the first electronic device;
- displaying and setting a second angle frame which display the content in a second angle by the second electronic device;
- wherein the synchronous displaying method for multi-view frames further comprises:
- when performing a specific operation to the first angle frame through the relation account of the server by the first electronic device, performing an alternation operation to the second angle frame displayed by the second electronic device correspondingly by the second electronic device.

11. The synchronous displaying method for multi-view frames according to claim 7, further comprising:
- determining one of the first electronic device and the second electronic device as a major electronic device by the server, wherein another one of the first electronic device and the second electronic device is a secondary electronic device, wherein the major electronic device is harder to be interrupted than the secondary electronic device for communication with the server;
- providing the display streamings in the plurality of angles to the major electronic device by the server; and
- transmitting the provided display streamings to the secondary electronic device by the major electronic device.

12. The synchronous displaying method for multi-view frames according to claim 7, wherein the step of providing the display streamings in the plurality of angles to the first electronic device and the second electronic device of the synchronization operation group which log in the relation account respectively by the server comprises:
- when providing the display streamings in the plurality of angles to the first electronic device and the second electronic device which log in the relation account respectively by the server, temporarily storing the provided display streamings in the first electronic device and the second electronic device respectively;
- wherein the step of displaying the frames of the content in the plurality of angles on the first electronic device and the second electronic device synchronously comprises:
- when a data volume of the display streaming temporarily stored in the first electronic device and the second electronic device respectively being higher than a predetermined volume, the first electronic device and the second electronic device starting displaying the frames of the content in the plurality of angles simultaneously.

* * * * *